(12) United States Patent
Davidovic et al.

(10) Patent No.: US 10,203,400 B2
(45) Date of Patent: Feb. 12, 2019

(54) OPTICAL MEASUREMENT SYSTEM INCORPORATING AMBIENT LIGHT COMPONENT NULLIFICATION

(71) Applicant: Avago Technologies International Sales Pte. Limited, Singapore (SG)

(72) Inventors: Milos Davidovic, Vienna (AT); Reinhard Enne, Hofstetten-Grünau (AT); Gunther Steinle, Regensburg (DE); Wolfgang Gaberl, Vienna (AT)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 232 days.

(21) Appl. No.: 15/143,266

(22) Filed: Apr. 29, 2016

(65) Prior Publication Data

US 2017/0031009 A1 Feb. 2, 2017

Related U.S. Application Data

(63) Continuation-in-part of application No. 14/815,266, filed on Jul. 31, 2015, now Pat. No. 9,880,266.

(51) Int. Cl.
*G01S 7/48* (2006.01)
*G01S 7/486* (2006.01)
(Continued)

(52) U.S. Cl.
CPC ........... *G01S 7/4865* (2013.01); *G01J 1/4204* (2013.01); *G01S 7/4876* (2013.01); *G01S 7/497* (2013.01); *G01S 17/08* (2013.01)

(58) Field of Classification Search
CPC ........... G01C 3/06; G01N 21/59; G01N 21/55
See application file for complete search history.

(56) References Cited

U.S. PATENT DOCUMENTS 6,463,393 B1 * 10/2002 Giger ............. G01S 7/497
356/5.13
7,891,570 B2  2/2011 Difazio et al.
(Continued)

FOREIGN PATENT DOCUMENTS

WO    2016000986 A1    1/2016

OTHER PUBLICATIONS

Niclass et al., "Design and Characterization of a CMOS 3-D Image Sensor Based on Single Photon Avalanche Diodes", IEEE Journal of Solid-State Circuits, vol. 40, No. 9, Sep. 2005.
(Continued)

*Primary Examiner* — Luke D Ratcliffe
(74) *Attorney, Agent, or Firm* — Sheridan Ross P.C.

(57) ABSTRACT

An optical measurement system is provided for performing time-of-flight distance measurement with ambient light suppression. The system has a detector circuit that includes a photodetector and an additional current gain element that amplifies the photocurrent produced by the photodetector. Placement of the additional current gain element near the photodetector allows low-power optical signals to be detected without amplifying noise from sources of the system that are outside of the detector circuit, thereby allowing a high signal-to-noise ratio to be achieved. Embodiments of the system include circuitry that automatically regulates the bias voltage of the photodetector to compensate for temperature and for fabrication process variations.

27 Claims, 10 Drawing Sheets

(51) Int. Cl.
*G01S 17/08* (2006.01)
*G01J 1/42* (2006.01)
*G01S 7/487* (2006.01)
*G01S 7/497* (2006.01)

(56) References Cited

U.S. PATENT DOCUMENTS

2009/0027652 A1* 1/2009 Chang ............... G01C 3/08
 356/4.01
2013/0169947 A1* 7/2013 Hakim ............... G01N 21/53
 356/3.1

OTHER PUBLICATIONS

Shcherbakova et al., "3D Camera Based on Linear-Mode Gain-Modulated Avalanche Photodiodes", ISSCC 2013, Session 27, Image Sensors, 27.7.
Brandl et al., "OWC Using a Fully Integrated Optical Receiver With Large-Diameter APD", IEEE Photonics Technology Letters vol. 27, No. 5, Mar. 1, 2015.
Davidovic et al., "A 33 x 25 µm² Low-Power Range Finder", Proc. IEEE International Symposium on Circuits and Systems, p. 922-925, 2012.
Zach et al., "Sunlight-proof optical distance measurements with a dual-line lock-in time-of-flight sensor", Analog Integr Circ Sig Process (2011) 68:59-68.

* cited by examiner

OPTICAL MEASUREMENT SYSTEM INCORPORATING AMBIENT LIGHT COMPONENT NULLIFICATION

CROSS-REFERENCE TO RELATED APPLICATIONS

This application is a continuation-in-part application of U.S. application Ser. No. 14/815,266 filed on Jul. 13, 2015, entitled "OPTICAL MEASUREMENT SYSTEM INCORPORATING AMBIENT LIGHT COMPONENT NULLIFICATION," of which priority to the filing date thereof is hereby claimed and which is hereby incorporated by reference herein in its entirety.

FIELD OF THE INVENTION

The invention relates to optical measurement systems, and more particularly, to optical measurement systems that incorporate ambient light measurement.

BACKGROUND

Optical measurement systems typically employ one or more photodetectors to detect incident light and then use information derived from the detected light for various purposes. For example, a photodetector incorporated into a digital camera (in the form of an image sensor) can be used to measure light intensities associated with various objects in a scene to be captured by the digital camera. Digital cameras generally include various exposure settings that can be used to address various ambient lighting conditions. The exposure settings can be suitably adjusted after an initial measurement of ambient light is carried out. The initial measurement may be carried out either by using circuitry contained in the digital camera itself or by using an external light meter. However, such ambient light measurements often prove to be rough approximations that do not accurately reflect the actual amount of ambient light that may be present at a particular moment in time when the camera is used to capture an image of an object located at a distance far from the camera.

In some applications other than photography, ambient light measurements can be carried out using various other techniques and procedures. However, in many instances, even the use of these other techniques and procedures fails to provide satisfactory results. For example, ambient light measurement circuitry used in some traditional time-of-flight optical distance measurement systems for measuring ambient light and addressing resulting adverse effects often proves inadequate and less than optimal. This shortcoming may be attributable, at least in part, to the more complex nature of the distance measurement procedure in comparison to various light detection procedures employed in digital cameras, for example.

As is known, a time-of-flight (TOF) optical distance measurement system operates by transmitting a beam of light towards a target object and then waiting to receive a reflected portion of the emitted light after reflection by the target object. The time delay between transmission of the light beam and reception of the reflected light is used to calculate the distance between the measurement system and the target object. Such TOF algorithms are known as direct TOF systems because the distance calculation is based directly on the time delay, i.e., the time of flight. In indirect TOF systems, the distance calculation is not directly calculated from the time delay, but is determined indirectly from the phase difference between the transmitted beam and the received reflected beam.

Understandably, the amount of reflected light can be very small in comparison to the amount of ambient light that may be present in the vicinity of the optical distance measurement system. Existing TOF optical distance measurement systems attempt to eliminate the effects of the ambient light with limited success due in part to complexities related to determining an optimal length of time (sampling period) that can be used for detecting an amount of ambient light with a satisfactory level of accuracy. An excessively long sampling period can lead to undesirable measurement delays with no guarantees that the ambient light will remain unchanged at the moment when the reflected light actually reaches a detector at a later instant in time. On the other hand, a short sampling period can lead to an improper measurement of the ambient light level. The above-referenced U.S. application Ser. No. 14/815,266 is directed to a variety of solutions for selecting the appropriate sampling period that are well suited for use in TOF optical distance measurement systems.

In addition to the robustness of the TOF optical distance measurement system against ambient light, receiver sensitivity, dynamic range and signal-to-noise ratio (SNR) are important performance parameters. For measurement systems that use small measurement spot sizes, laser eye safety requirements limit the allowed average output power of the light transmitting device, which is typically a laser diode. In order to meet certain system performance parameters relating to, for example, measurement range, measurement speed, remission and reflection properties of the measurement target, measurement precision, and the size of the receiver optics, the effective receiver SNR should be maximized in order to achieve high receiver sensitivity. At the same time, the dynamic range of the measurement system is an important performance parameter. The measurement device should be capable of accepting very high signal strength of a nearby highly-reflecting object, which requires the measurement device to have high overload thresholds. However, other important performance parameters such as measurement speed (e.g., frame rate) and signal linearity can be compromised by the use of signal amplification or noise damping measures.

It is therefore desirable to provide an optical measurement system that provides robust ambient light suppression, that has a high SNR, that has high receiver sensitivity, and that is capable of operating over a wide dynamic range.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

WRITTEN DESCRIPTION

Figure 1:
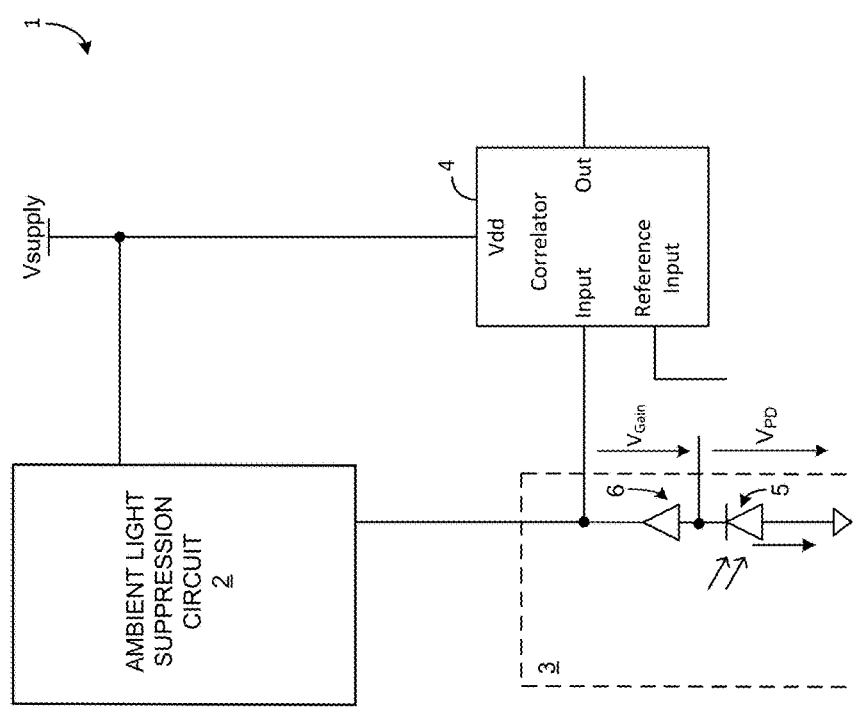
FIG. 1 shows an exemplary embodiment of an optical measurement system in accordance with the disclosure.

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects and actions that are generally understood in various forms and equivalencies by persons of ordinary skill in the art. For example, the word "switch" generally refers to various types of switching elements such as, for example, a relay or a solid state switch, and the word "photodetector" refers to various kinds of light sensing elements such as, for example, a photodiode, a photocell, or a complementary metal oxide semiconductor (CMOS) imaging sensor. It should also be understood that the word "example," as used herein, is intended to be non-exclusionary and non-limiting in nature. More particularly, the word "exemplary" as used herein indicates one among several examples, and it must be understood that no undue emphasis or preference is being directed to the particular example being described.

In terms of a general overview, an optical measurement system in accordance with the disclosure includes a detector circuit, an ambient light suppression circuit, and a correlator circuit. In accordance with an embodiment, the ambient light suppression circuit is a sample and hold circuit and an amount of current that flows through a photodetector of the detector circuit is proportional to a conductivity state of a transistor of the ambient light suppression circuit. More particularly, the conductivity state of the transistor is determined by a voltage bias that is applied to a gate terminal of the transistor when the sample and hold circuit executes a sampling mode of operation. The sampling mode of operation is executed in order to detect an amount of ambient light incident upon the photodetector. When the ambient light suppression circuit is in the hold mode of operations, the amount of ambient light that was detected by the detector circuit during the sampling mode of operations is used by the correlator circuit to suppress or nullify the effects of ambient light on the measurement results before performing the correlation operations. In accordance with another embodiment, the ambient light suppression circuit receives the output of the photodetector, converts it into a voltage signal and compensates the voltage signal to suppress the effects of ambient light. The correlator circuit then performs the correlation operations using the compensated voltage signal. In the latter case, the ambient light suppression circuit may be part of the correlator circuit or it may be a separate circuit that produces an output signal that is used by the correlator circuit.

In accordance with an exemplary embodiment, the detector circuit includes a current gain element that amplifies the output of the photodetector. The current gain element improves the SNR and sensitivity of the detector circuit. Placement of the current gain element very near the photodetector reduces the likelihood that the current gain element will amplify noise in the measurement system. In accordance with an exemplary embodiment, the optical measurement system includes circuitry that automatically regulates the bias voltage of the photodetector to compensate for temperature and for fabrication process variations.

FIG. 1 illustrates a block diagram of the optical measurement system 1 in accordance with an exemplary embodiment having an ambient light suppression circuit 2, a detector circuit 3 and a correlator circuit 4. In accordance with this embodiment, the detector circuit 3 includes a photodetector 5 and an additional gain element 6, which may a separate device from the photodetector 5 or integrated therewith in a single integrated circuit (IC) chip. In accordance with this embodiment, the ambient light suppression circuit 2 is the aforementioned sample and hold circuit and an amount of current that flows through the photodetector 5 of the detector circuit 3 is proportional to a conductivity state of a transistor (not shown) of the ambient light suppression circuit. Various embodiments of the ambient light suppression circuit configured as a sample and hold circuit and the manner in which it operates in conjunction with the detector circuit and the correlator circuit are described below in detail with reference to FIGS. 3-10.

In general, the system 1 operates in the following manner. When the ambient light suppression circuit 2 is in the sampling mode of operation, the photodetector 5 has a current conductivity that is proportional to the intensity of the ambient light falling upon the photodetector 5. During the sampling mode of operations, the system 1 does not generate optical beams to be reflected from a target object, and therefore only ambient light is being detected by the photodetector 5. Upon completion of the sampling mode of operation, the ambient light suppression circuit 2 is placed in a hold mode of operation during which circuit 2 provides a desired time constant for maintaining the current flowing through the photodetector 5. During the hold mode of operation, the system 1 is in an operating condition in which it emits a desired light signal of a light signal of a desired wavelength or wavelength range, which is then reflected from a target object. The reflected light incident upon the photodetector 5. Therefore, during the hold mode of operation, the light that is incident upon the photodetector 5 is a combination of ambient light and the desired light, thus resulting in a change in the nature of current flowing through the photodetector 5. The change in nature of this current flow is directly proportional to the intensity of the desired light signal. The correlator circuit 4 detects this change and uses it to suppress or nullify the effects of ambient light upon optical measurements before performing the correlation operations.

The current gain element 6 amplifies the output of the photodetector 5. The current gain element 6 improves the SNR and the sensitivity of the detector circuit 4. Placement of the current gain element 6 very near the photodetector 5 reduces the likelihood that the current gain element 6 will amplify noise in the measurement system from sources outside of the detector circuit 4.

Figure 2:
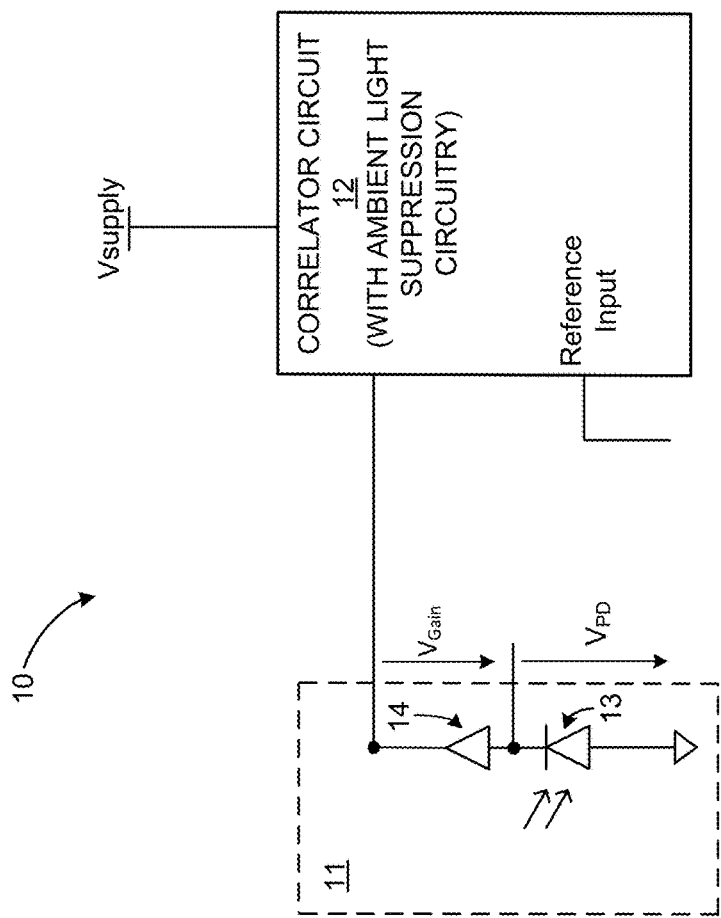
FIG. 2 shows an exemplary embodiment of an optical measurement system in accordance with the disclosure.

FIG. 2 illustrates a block diagram of the optical measurement system 10 in accordance with an exemplary embodiment having a detector circuit 11 and a correlator circuit 12 that includes ambient light suppression circuitry. In accordance with this embodiment, the detector circuit 11 includes a photodetector 13 and an additional gain element 14, which may a separate device from the photodetector 13 or integrated therewith in the same IC chip. In accordance with this embodiment, the correlator circuit 12 performs ambient light suppression simultaneously as it performs the correlation operations.

In general, the system 10 operates in the following manner. During a time period when the system 10 is not emitting desired light to be reflected from a target object, only ambient light is being detected by the photodetector 13. During this time period, the photodetector 13 is generating a current, which is amplified by the current gain element 14 and input to the correlator circuit 12. Inside of the correlator circuit 12, this current signal is converted into a first voltage signal that is proportional to the ambient light striking the photodetector 13. At the end of this time period and during subsequent time period, the desired light is emitted by the system 10 and is reflected off of the target object. The reflected desired light is incident on the photodetector 13. The current signal generated by the photodetector 13 is amplified by the gain element 14 and is input to the correlator circuit 12. This current signal is converted into a second voltage signal that is proportional to the amount of desired light and ambient light that is incident on the photodetector 13. The first voltage signal corresponding to the ambient light is subtracted from the second voltage signal corresponding to the combination of the desired light and ambient light to produce a voltage signal that is compensated for the effect of the ambient light. The compensated voltage is used to perform the correlation operations in the correlator circuit 12.

A variety of ambient light suppression circuits are known that are used to suppress, or compensate, the effects of ambient light when attempting to measure desired light. The invention is not limited with respect to the type or configuration of the ambient light suppression circuit that is used in the optical measurement system of the invention. Persons of skill in the art will understand, in view of the description provided herein, the how to choose a suitable ambient light suppression circuit for use in the optical measurement system. Examples of the ambient light suppression circuit 2 shown in FIG. 1 are disclosed herein and in parent U.S. application Ser. No. 14/815,266. Examples of the correlator circuit 12 with ambient light suppression circuitry are disclosed in an article entitled "Sunlight-proof optical distance measurements with a dual-line lock-in time-of-flight sensor," of which one of the inventors in the present application is a co-author, which was published in January 2011 in Analog Integrated Circuit Signal Processing, and which is incorporated by reference herein in its entirety.

The optical measurement systems 1 and 10 shown in FIGS. 1 and 2, respectively, may be used in a variety of applications. For example, in a first application, which is an image capture application, the received desired light can correspond to light associated with various points on one or more target objects (not shown) that are to be captured in image form. In a second application, which is a time-of-flight optical distance measurement application, the received desired light can correspond to light reflected by a target object (not shown) in response to a beam of light transmitted by the optical measurement system 1, 10 towards the target object. The time delay between transmission of the light beam by the optical measurement system 1, 10 and receiving of the reflected light in the photodetector 5, 13 is used by the optical measurement system 1, 10 to calculate a distance between the optical measurement system 1, 10 and the target object.

The term "desired light," as that term is used herein, denotes light of a particular wavelength or wavelength range that is emitted by the optical measurement system 1, 10 and reflected off of a target object with the goal of detecting at least a portion of the reflected light with a photodetector. In many situations, the intensity of the ambient light may be significantly higher than a desired light input. It is therefore desirable to nullify or eliminate the adverse effects of ambient light incident upon the photodetector 5, 13 when the optical measurement system 1, 10 is used for carrying out various types of optical measurements. Nullifying or eliminating the adverse effects of ambient light upon optical measurements can be typically carried out by detecting an amount of current flowing through the photodetector 5, 13 in response to ambient light that is present when a measurement procedure is initiated by the optical measurement system 1, 10 and then taking the detected current flow into consideration when the photodetector 1, 10 subsequently receives a desired light signal in the presence of the ambient light. These aspects will be described below in further detail.

Figure 3:
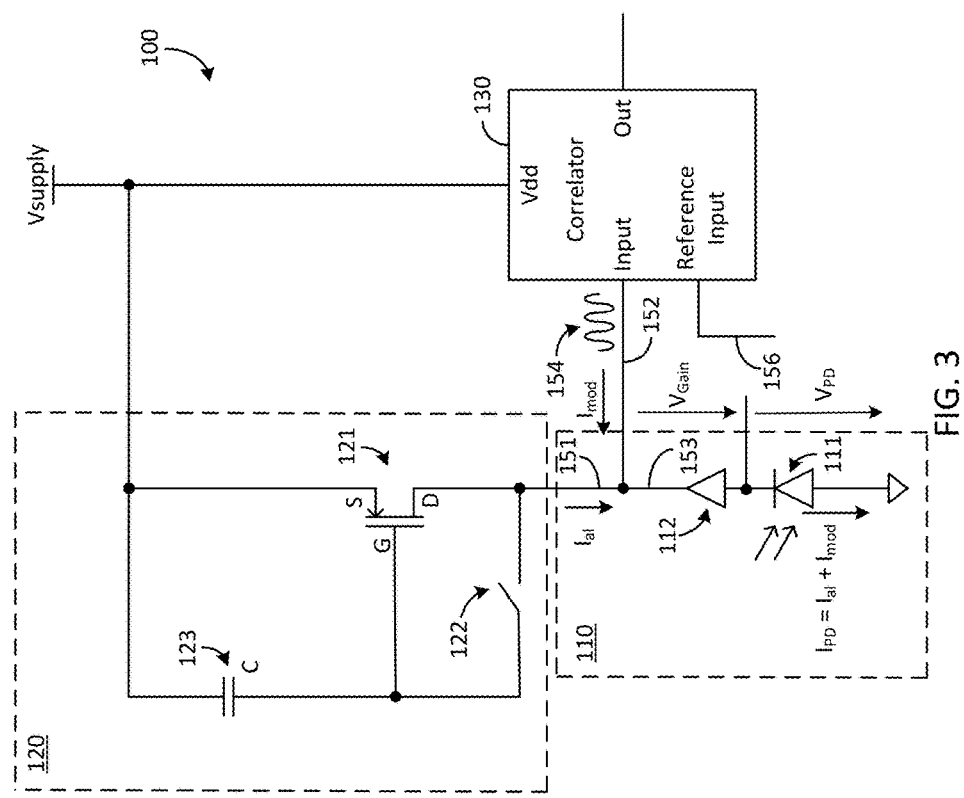
FIG. 3 shows an exemplary embodiment of an optical measurement system in accordance with the disclosure.

Attention is now drawn to FIG. 3, which shows another exemplary embodiment of an optical measurement system 100 that uses an embodiment of the ambient light suppression circuit 2 shown in FIG. 1. The optical measurement system 100 includes a detector circuit 110, an ambient light suppression circuit 120 and a correlator circuit 130. A photodetector 111 of the detector circuit 110 is configured to receive various types of light input associated with a wide variety of applications. For example, the optical measurement system 100 may be used in an image capture application, in which case the received desired light can correspond to light associated with various points on one or more target objects (not shown) that are to be captured in image form. As another example, the optical measurement system 100 is used in a time-of-flight optical distance measurement application, in which case the received desired light can correspond to light reflected by a target object (not shown) in response to a beam of desired light transmitted by the optical measurement system 100 towards the target object. The time delay between transmission of the light beam by the optical measurement system 100 and receiving of the reflected light in the photodetector 111 is used by the optical measurement system 100 to calculate a distance between the optical measurement system 100 and the target object.

Irrespective of the nature of the application, the photodetector 111 may be exposed to ambient light at the moment in time when the desired light (i.e., light of a target wavelength reflected by a target object) is incident upon the photodetector 111.

The photodetector 111 is coupled in series with a current gain element 112 and with a field effect transistor (FET) 121 that is a part of the ambient light suppression circuit 120. It should be noted that in other embodiments, other kinds of transistors can be used in place of the FET 121. In accordance with this exemplary embodiment, the ambient light suppression circuit 120 is a sample and hold circuit, and therefore will be referred to as such hereinafter. The sample and hold circuit 120 includes a sampling switch 122 and a capacitor 123. The sampling switch 122 is used to selectively couple a gate terminal of the FET 121 to a drain terminal of the FET 121. The capacitor 123 is connected to the gate and source terminals of the FET 121. The capacitor 123 has a predetermined value that is selected to provide a predetermined time constant that sets a sampling time period and a hold time period for the sampling and hold modes of operations, respectively, of the sample and hold circuit 120.

The operation of the various components of the optical measurement system 100 will now be described in further detail. The sample and hold circuit 120 is first placed in a sampling mode of operation by placing switch 122 in a closed position, thereby directly coupling the gate terminal ("G") of the FET 121 to the drain terminal ("D") of the FET 121. The sampling mode of operation is used to allow the optical measurement system 100 to detect ambient light present in the vicinity of the optical measurement system 100 with a desired degree of accuracy. During the sampling mode of operation, the correlator circuit 130 can be placed in an inactive state. In certain applications, the level of measurement accuracy may be further enhanced by preventing light other than ambient light from being incident upon the photodetector 111 during the sampling mode of operation. Thus, for example, when the optical measurement system 100 is a time-of-flight distance measurement system, the sampling mode of operation can be activated when no light has been transmitted by the time-of-flight distance measurement system towards a target object, thereby precluding reflected light from the target object being incident upon the photodetector 110.

When the sample and hold circuit 120 is in the sampling mode of operation, the photodetector 111 has a current conductivity that is proportional to the intensity of the ambient light falling upon the photodetector 111. The current conductivity, further amplified by the current gain element 112, results in a source-to-drain current (labeled "$I_{a1}$") being drawn through the FET 121 and propagating via a line 151 to the photodetector 111. Thus, the photodetector current $I_{PD}$ during the sampling mode of operation is given as $I_{PD}=I_{a1}$.

A time constant "T" associated with the source-to-drain current ("$I_{a1}$") propagating through the FET 121 is determined by the value of the capacitor 123 and can be represented by the following equation: $T \propto C/\sqrt{(I_{PD})}$ where C corresponds to the value of the capacitor 123 and $I_{PD}$ is the current propagating through the photodetector 111 amplified by the current gain element 112. Understandably, the time constant "T" can be modified by changing the value of C and/or by adding capacitors in parallel or in series with capacitor 123. Parent U.S. application Ser. No. 14/815,266 provides several examples of sample and hold circuits and methods for adjusting their time constants that may be used with embodiments described herein to achieve a suitable time constant for the sample and hold circuit 120.

Upon completion of the sampling mode of operation, the sample and hold circuit 120 is placed in a hold mode of operation during which the sampling switch 122 is placed in an open position and the capacitor 123 is left connected between the gate terminal and the source terminal of the FET 121. The connection of the capacitor 123 between the gate terminal and the source terminal of the FET 121 causes the sample and hold circuit 120 to provide a desired time constant for current flowing through the photodetector 111 during the hold mode of operation.

During the hold mode of operation, the optical measurement system 100 is in an operating condition that allows a desired light signal of a desired wavelength or wavelength range to be reflected from a target object and incident upon the photodetector 111. Specifically, during the hold mode of operation, the amount of light incident upon the photodetector 111 is a combination of ambient light and the desired light, thus resulting in a change in the nature of current flowing through the photodetector 111, which is indicated in FIG. 3 as a current flow "$I_{PD}=I_{a1}+I_{mod}$." The change in nature of this current flow, $I_{mod}$, is directly proportional to the intensity of the desired light signal, and this feature can be advantageously used in accordance with the disclosure for suppressing or nullifying the effects of ambient light upon optical measurements.

Thus, for example, when the optical measurement system 100 is a time-of-flight distance measurement system, the hold mode of operation can be activated after a modulated beam of desired light (i.e., light of the desired wavelength or wavelength range) has been transmitted by the time-of-flight distance measurement system towards a target object. At least a portion of the modulated beam of light is reflected from the target object and is incident upon the photodetector 111, thus leading to the current flow "$I_{PD}=I_{a1}+I_{mod}$" through the photodetector 111. During the hold mode of operation, the correlator circuit 130 is placed in an active state. While in the active state, the correlator circuit 130 uses the $I_{mod}$ current propagating through the line 152 in order to carry out a distance measurement operation.

In one example implementation, a digital clock signal may be used to generate the modulated beam of light that is transmitted by the time-of-flight distance measurement system towards the target object. Typically as a result of bandwidth limitations, the modulated beam of light transmitted out of the time-of-flight distance measurement system has a sinewave characteristic rather than a square wave or a rectangular wave characteristic. Consequently, light that is reflected by the target object and incident upon the photodetector 111 also has a sinewave characteristic, thus resulting in the "$I_{PD}$" current flowing through the photodetector 111 having a sinewave current component ("$I_{mod}$"). The sinewave current component ("$I_{mod}$") is propagated to the photodetector 111 via line 152, and is indicated in FIG. 3 as a sinewave pattern 154.

During the sampling period that occurred before the hold period, the $I_{mod}$ component was not present, and therefore $I_{PD}=I_{a1}$ during the sampling period. During the sampling period, the correlator circuit 130 measures $I_{PD}$, which it knows is proportional to the ambient light striking the photodetector 111. During the subsequent hold period, $I_{PD}=I_{a1}+I_{mod}$, and the correlator circuit 130 measures $I_{PD}$, which it knows is proportional to the amount of desired light plus the amount of ambient light striking the photodetector 111. Therefore, the correlator circuit 130 determines $I_{mod}$ during the hold period by taking the difference between $I_{PD}$ measured during the hold period and $I_{PD}$ measured during the preceding sampling period and uses this value to derive a distance measurement result. In particular, the correlator circuit 130 compares $I_{mod}$ to a reference signal coupled into the correlator circuit 130 via a line 156 to derive the distance measurement result. The reference input signal can be the digital clock signal that was originally used for modulating the emitted beam of light. For example, the correlator circuit 130 can measure a phase offset between the reference input signal and the sinewave current component $I_{mod}$ and use the measured phase offset to determine a round trip time of the modulated beam. The round trip time can then be used to calculate a distance between the TOF distance measurement system and the target object (indirect TOF). In an alternative approach, in lieu of a phase offset measurement, a time delay measurement may be carried out, for example, when the transmitted signal is a light impulse signal and the reference input signal provided to the correlator circuit 130 is a trigger pulse that was used for generating the light impulse signal (direct TOF).

Correlator circuits are known that are used in known direct and indirect TOF optical distance measurement systems to correlate two signals to determine a phase difference between them or to determine a time delay between the time instant when the signal was transmitted and the time instant when a reflected portion of the transmitted signal is received. For example, a variety of TOF range finder systems that use a variety of correlator circuit configurations are known. Therefore, the correlation circuit 130 can have a variety of configurations for performing the correlation operations. Because correlator circuits that perform these functions are known, and because the correlator circuit 130 can have a variety of configurations, the correlator circuit 130 will not be described in further detail herein in the interest of brevity.

The current gain element 112 of the detector circuit 110 improves the sensitivity of the detector circuit 110 and the SNR of the optical measurement system 100. The photocurrent produced by the photodetector 111 can be very small in certain cases, such as when the target from which the desired light is reflected is a relatively large distance away from the optical measurement system 100. Also, the amount of the photocurrent that is attributable to the desired light reflected from the target can be small compared to the amount of the photocurrent that is attributable to the ambient light. As indicated above, in some cases the desired light emitted by the system 100 is required to be a low-power optical signal, e.g., in order to meet eye safety requirements. Use of the current gain element 112 helps achieve the desired receiver sensitivity and SNR, while at the same time, allowing the detector circuit 110 to have a very wide dynamic range for detecting signals ranging from very weak intensities to very strong intensities. However, placement of the current gain element at a location in the optical measurement system 100 that is not near the photodetector 110 can result in noise contributed by other sources in the system 100 being amplified, thereby adversely affecting the SNR and measurement accuracy. For this reason, in accordance with exemplary embodiments disclosed herein, the current gain element 112 is placed inside of the detector circuit 110 very near the photodetector 111.

Figure 4:
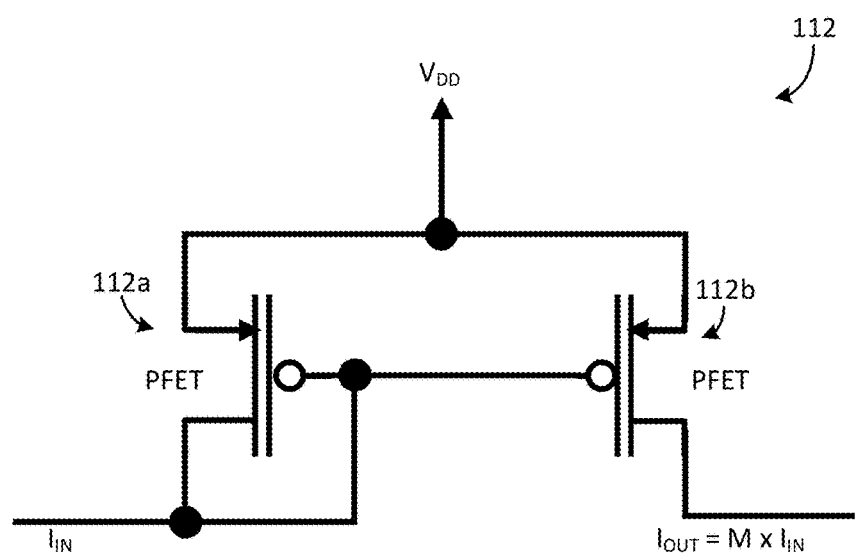
FIG. 4 shows an exemplary embodiment of current gain element that may be used in the detector circuit of the optical measurement system shown in FIG. 3.

The current gain element 112 can have various designs and can be made of various components, including, for example, operational amplifiers (Op Amps), one or more bipolar junction transistors (BJTs) or one or more FETs. FIG. 4 illustrates a schematic diagram of the current gain element 112 in accordance with an embodiment in which it is made up of a combination of p-type FETs (PFETs) 112$a$ and 112$b$ configured as a current mirror. The PFETs 112$a$ and 112$b$ are asymmetric in that PFET 112$b$ has a width, $W_2$, that is about twice the width, $W_1$, of PFET 112$a$. The gates of the PFETs 112$a$ and 112$b$ are tied together and the gate and drain of PFET 112$a$ are tied together to form the current mirror. The input current, $I_{IN}$, is the photocurrent received in the current gain element 112 from the photodetector 111. The output current of the current gain element 112, $I_{OUT}$, is equal to $I_{IN} \times M$, where M is the gain of the current gain element calculated as $W_2/W_1=M$. The capacitance of PFET 112$a$ should be chosen to be small enough to fulfill the modulation speed requirements for the minimum applicable photocurrent. The arrangement of the PFETs shown in FIG. 4 can be cascaded to optimize gain and speed.

Figure 5:
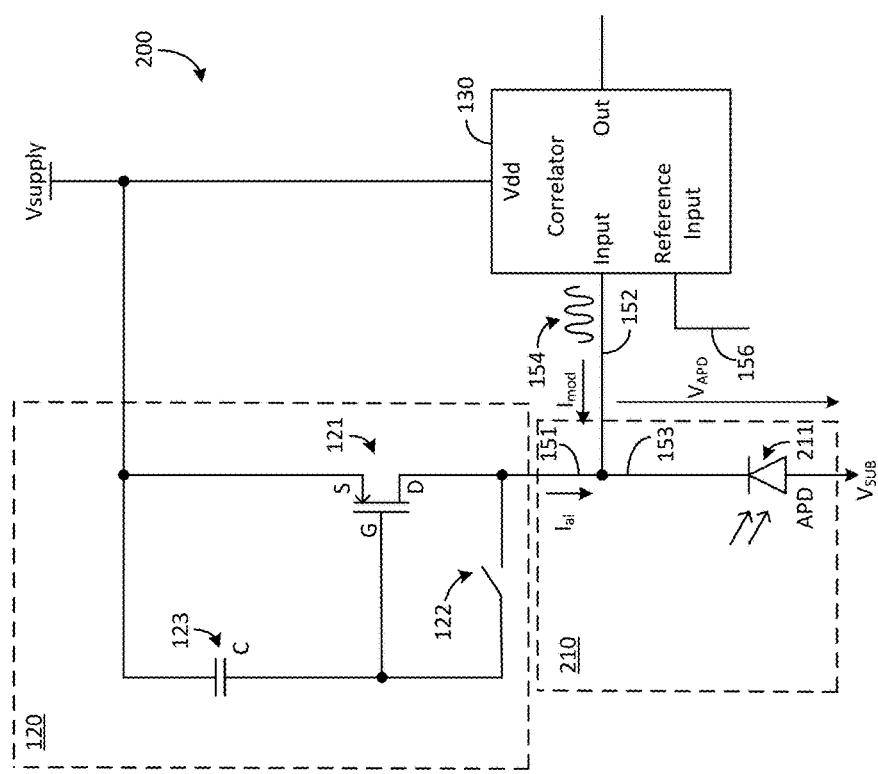
FIG. 5 shows an exemplary embodiment of an optical measurement system in accordance with the disclosure.

FIG. 5 illustrates the optical measurement system 200 in accordance with an exemplary embodiment in which the detector circuit 210 comprises a photodetector 211 that has an additional current gain element monolithically integrated therein. The photodetector 211, in accordance with this embodiment, is an Avalanche photodiode (APD), which is a well-known type of photodiode that has a photocurrent gain element monolithically integrated therewith in a complementary metal oxide semiconductor (CMOS) IC package (not shown). The APD 211 is operated in the linear region and has a built-in current gain that is dependent on the bias voltage of the APD 211. The photocurrent is directly amplified in an avalanche multiplication region of the APD 211. In all other respects, the optical measurement system 200 operates in the manner described above with reference to FIG. 3. The structure (not shown) of the APD 211 can be optimized to have a low excess noise factor and a low breakdown voltage by having a concentrated, or compact, multiplication region and a relatively thick, low-doped absorption region. With this design, the structure of the APD 211 is mainly amplifying electrons drifting from the absorption region into the multiplication region, which leads to low excess noise due to amplification and high total quantum efficiency of absorption due to the thicker absorption region.

Figure 6:
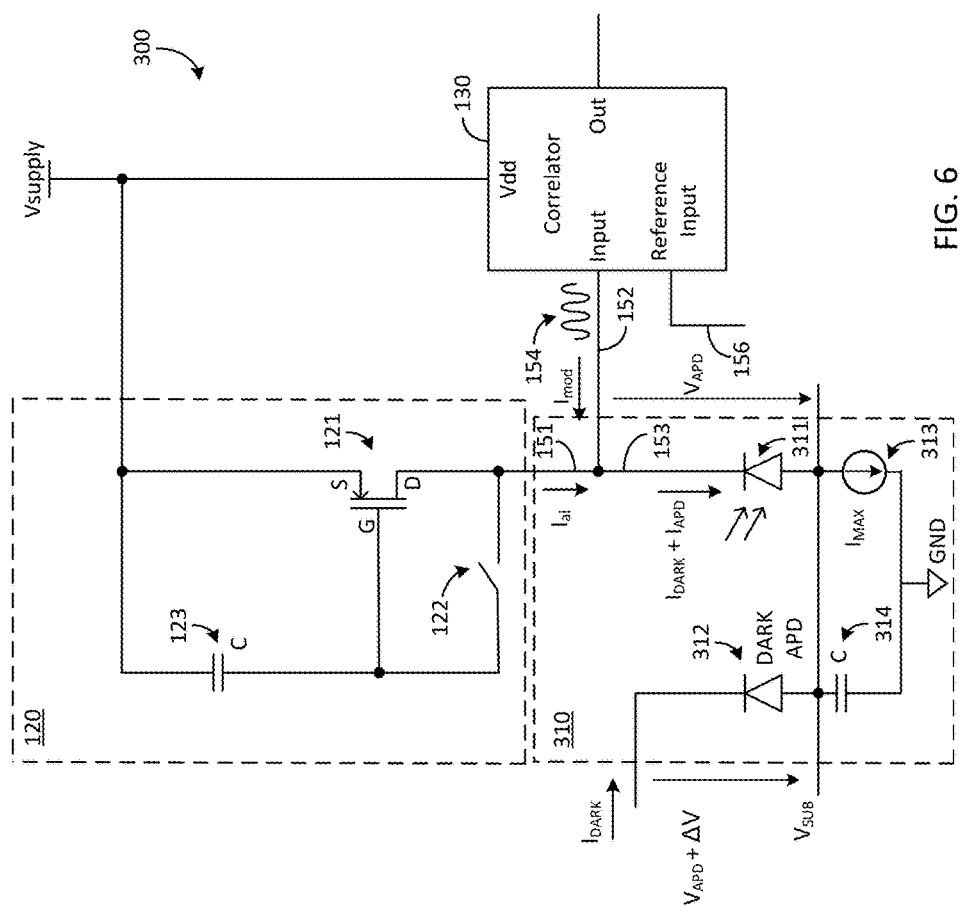
FIG. 6 shows an exemplary embodiment of an optical measurement system in accordance with the disclosure.

FIG. 6 illustrates a block diagram of the optical measurement system 300 in accordance with another illustrative embodiment in which the detector circuit 310 comprises a first APD 311 that acts as the photodetector and second APD 312 that is shielded to prevent light from being incident thereon. The second, shielded APD 312 is referred to hereinafter as the "dark APD 312." Therefore, any current produced by the dark APD 312 is not influenced by incident light on the dark APD 312. The photodetector APD 311 and the dark APD 312 preferably have identical designs and are made using the same fabrication process in order to compensate for fabrication process variations. The optimal, or most desirable, operating bias voltage for an APD is strongly dependent on various factors, including junction operating temperature and fabrication process variations. Consequently, the dark current produced by the dark APD 312 can be used to set the bias voltage of the photodetector APD 311 to a suitable operating point in order to compensate for junction operating temperature and fabrication process variations, as will now be described.

A current source 313 that has a maximum current, $I_{MAX}$, is connected between the anode of the photodetector APD 311 and ground. An alternating current (AC) decoupling capacitor 314 is connected between the anode of the dark APD 312 and ground such that the capacitor 314 and the current source 313 are in parallel with one another. Although not shown in FIG. 6 for ease of illustration, the cathode of the dark APD 312 is electrically coupled to an integrator (not shown) that integrates electrons that make up the dark current, $I_{Dark}$. The total APD current through the photodetector APD 311, $I_{APD\_Total}$, is equal to the sum of the dark current, $I_{Dark}$, and the photocurrent, $I_{APD}$, of the photodetector APD 311 attributable to light that is incident on the photodetector APD 311: $I_{APD\_Total}=I_{Dark}+I_{APD}$. The total APD current, $T_{APD\_Total}$, is regulated by the current source 313 to not exceed $I_{Max}$ produced by the current source 313 and is kept constant to prevent high optical receive power on the photodetector APD 311 from causing the photodetector APD 311 to become saturated. Limiting the photocurrent of the photodetector APD 311 in this manner also prevents self-heating of the photodetector APD 311 to junction temperatures that can adversely affect the operations of the photodetector APD 311.

In addition, in order to operate the photodetector APD 311 at a bias voltage that achieves a high SNR, provides a sufficiently large gain and limits excess noise, the photodetector APD 311 is automatically regulated to operate at a bias voltage that is below the breakdown voltage of the APDs 311 and 312. To accomplish this, the dark APD 312 is operated at a bias voltage that is equal to the breakdown voltage, $V_{BD}$, and that is greater than the bias voltage, $V_{APD}$, at which the photodetector APD 311 operates by a voltage difference, $\Delta V$. In other words, the dark APD 312 is operated at a bias voltage that is equal to its breakdown voltage and the photodetector APD 311 is automatically regulated by the current source 313, based on changes in the dark current, to operate at a bias voltage that is $\Delta V$ below the breakdown voltage of the photodetector APD 311. By automatically regulating the bias voltage operating point of the photodetector APD 311 based on changes in $I_{Dark}$, the above goals of providing a high SNR, providing a sufficiently large gain, and limiting excess noise are achieved. At the same time, the current source 313 prevents the photodetector APD 311 from becoming saturated and/or becoming too hot in cases where light that is incident on the photodetector APD 311 has very high optical power.

Figure 7:
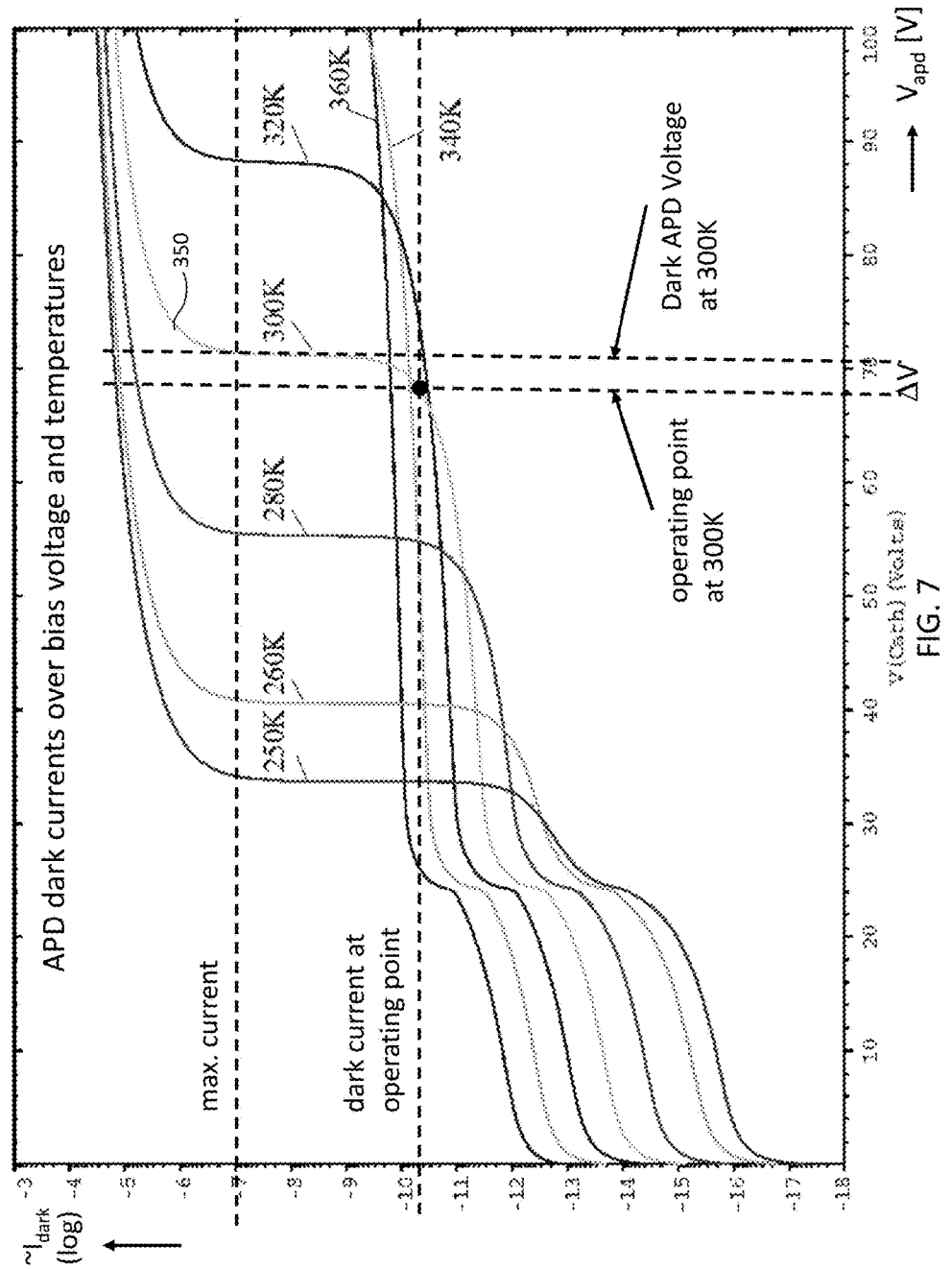
FIG. 7 shows a plot of Avalanche photodetector dark currents over bias voltage and temperature.

FIG. 7 illustrates a plot showing the relationship between APD dark currents (logarithmic scale) over bias voltage (Volts) and junction temperature (Kelvins). The plot shows the strong temperature dependence of the dark currents. In an actual APD, the absolute value of the dark current depends on many technology and process parameters and can vary greatly among APDs. The relative change of the dark currents with bias voltage is a characteristic of junction temperature, bias voltage and the design of the APD. As can be seen in FIG. 7 for the curve 350 corresponding to a junction temperature of 300 Kelvins, the amount of dark current that is produced results in the photodetector APD 311 operating at a bias voltage that is $\Delta V$ below the bias voltage at which the dark APD 312 is operating due to the limiting effect of the current source 313 on the photocurrent generated by the photodetector APD 311 in the presence of the dark current. As will be described below in more detail, the known relationship between dark current over bias voltage and temperature shown in FIG. 7 is used in accordance with some embodiments described herein to allow a suitable bias voltage to be selected from a lookup table (LUT) based on measurements of dark current and temperature.

Figure 8:
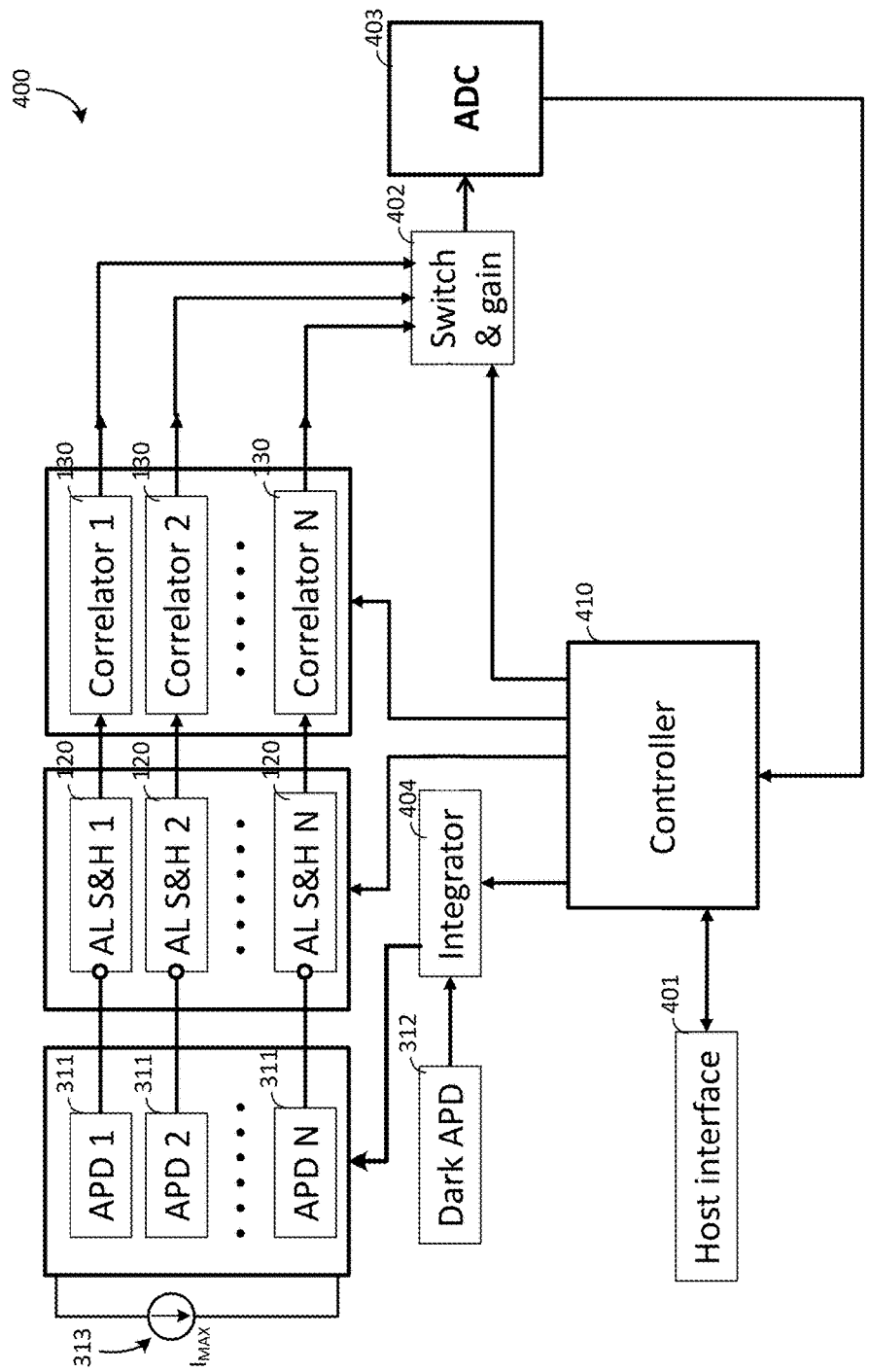
FIG. 8 shows an exemplary embodiment of an optical measurement system in accordance with the disclosure.

FIG. 8 illustrates a block diagram of the optical measurement system 400 in accordance with another illustrative embodiment that incorporates N photodetector APDs 311, N ambient light sample and hold (AL S&H) circuits 120 and N correlator circuits 130, where N is a positive integer that is greater than or equal to 2. The N photodetector APDs 311 can be arranged as an array of photosensor pixels similar to the manner in which photosensor pixels are arranged in arrays inside of a camera. A controller 410 of the system 400 controls the operations of the system 400 and communicates with a host interface 401 of the system 400. Switching and gain control circuitry (Switch & gain) 402 of the system 400 is controlled by the controller 410 to selectively provide the correlation results output from the correlator circuits 130 to an ADC 403 of the system 400. The ADC 403 converts the correlation results into digital values, which are then input to the controller 410 and may be communicated by the controller 410 to the host interface 401. A dark APD 312 that is identical in design to the photodetector APDs 1-N 311 produces a dark current that is integrated by an integrator 404 and provided to the switching and gain control circuitry 402. The dark APD 312 is shielded to prevent light from being incident thereon and is used in the manner described above with reference to FIG. 6. A current source 313 is used in the manner described above with reference to FIG. 6 to automatically regulate the photocurrents and bias voltages of the APDs 1-N 311 in the manner described above with reference to FIG. 6.

In accordance with the embodiment shown in FIG. 8, a single dark APD 312 and a single current source 313 are used to regulate the bias voltages and photocurrents of the N APDs 311. Therefore, in accordance with this embodiment, the detector circuit is made up of the N photodetector APDs 311, the dark APD 312, the integrator 404 and the current source 313. In all other respects, the detector circuit operates in the manner described above with reference to FIG. 6. The switching and gain control circuitry 402 allows a single ADC 403 to be used to digitize the N correlation results produced by the N correlator circuits 130. The gain control portion of the circuitry 402 scales the analog values to levels that are suitable for being input to the ADC 403.

Figure 9:
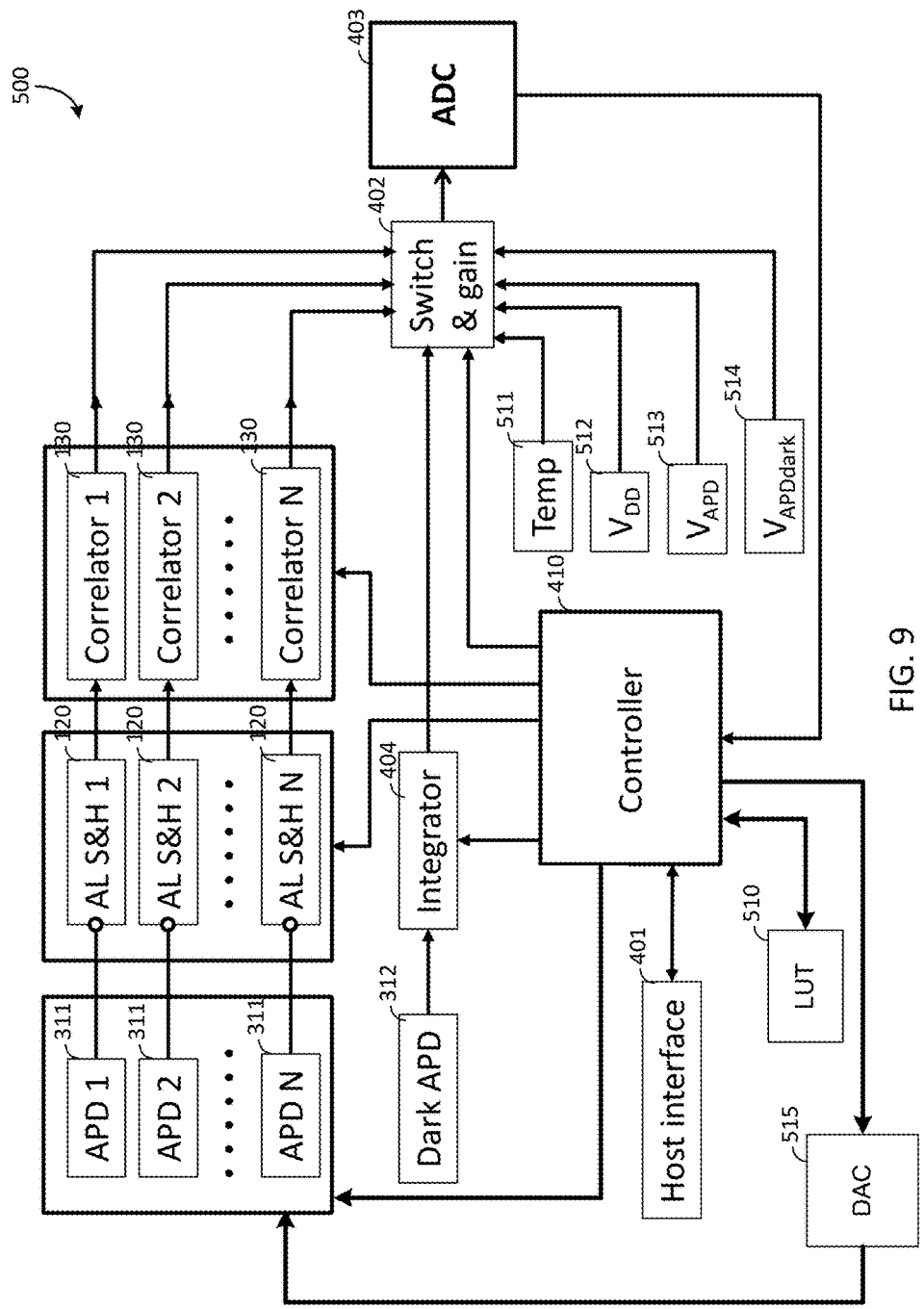
FIG. 9 shows an exemplary embodiment of an optical measurement system in accordance with the disclosure.

FIG. 9 illustrates a block diagram of the optical measurement system 500 in accordance with another illustrative embodiment. As with the optical measurement system 400 shown in FIG. 8, the optical measurement system 500 incorporates N photodetector APDs 311, N AL S&H circuits 120 and N correlator circuits 130. Unlike the optical measurement system 400 shown in FIG. 8, the optical measurement system 500 does not include the current source 313 or the connection between the integrator 404 and the photodetector APDs 311 shown in FIG. 8. In accordance with this embodiment, the integrator 404 is connected to the switching and gain control circuitry 402. In accordance with this embodiment, the optical measurement system 500 includes a LUT 510, a temperature monitoring device 511, a supply voltage ($V_{DD}$) monitoring device 512, a photodetector APD bias voltage monitoring device 513 and a dark APD bias voltage monitoring device 514.

As indicated above with reference to FIGS. 6 and 7, there is a known relationship between the dark current, the bias voltage and the temperature of the APD. In accordance with the embodiment shown in FIG. 9, this known relationship is exploited to set the bias voltages of the photodetector APDs 311. The controller 410 controls the operations of the switching and gain control circuitry 402 to selectively provide the correlation results output from the correlator circuits 130, the dark current output from the integrator 404, and the analog values output from the monitoring devices 511-514 to the ADC 403. The ADC 403 converts these analog values into digital values, which are then input to the controller 410. The controller 410 uses at least the digital values corresponding to the dark current and the temperature to lookup a corresponding bias voltage in the LUT 510 to be used by the photodetector APDs 311. A digital-to-analog converter (DAC) 515 converts the digital bias voltage value output from the LUT 510 into an analog bias voltage value and provides it to the photodetector APDs 311. There are also known relationships between the dark current, the supply voltage, $V_{DD}$, the bias voltage, $V_{APD}$, of the photodetector APDs 311 and the bias voltage, $V_{APDdark}$, of the dark APD 312, which the controller 410 may take into account in looking up the bias voltage value from the LUT 510. For this reason, the monitoring devices 512-514 are optionally included in the system 500.

Figure 10:
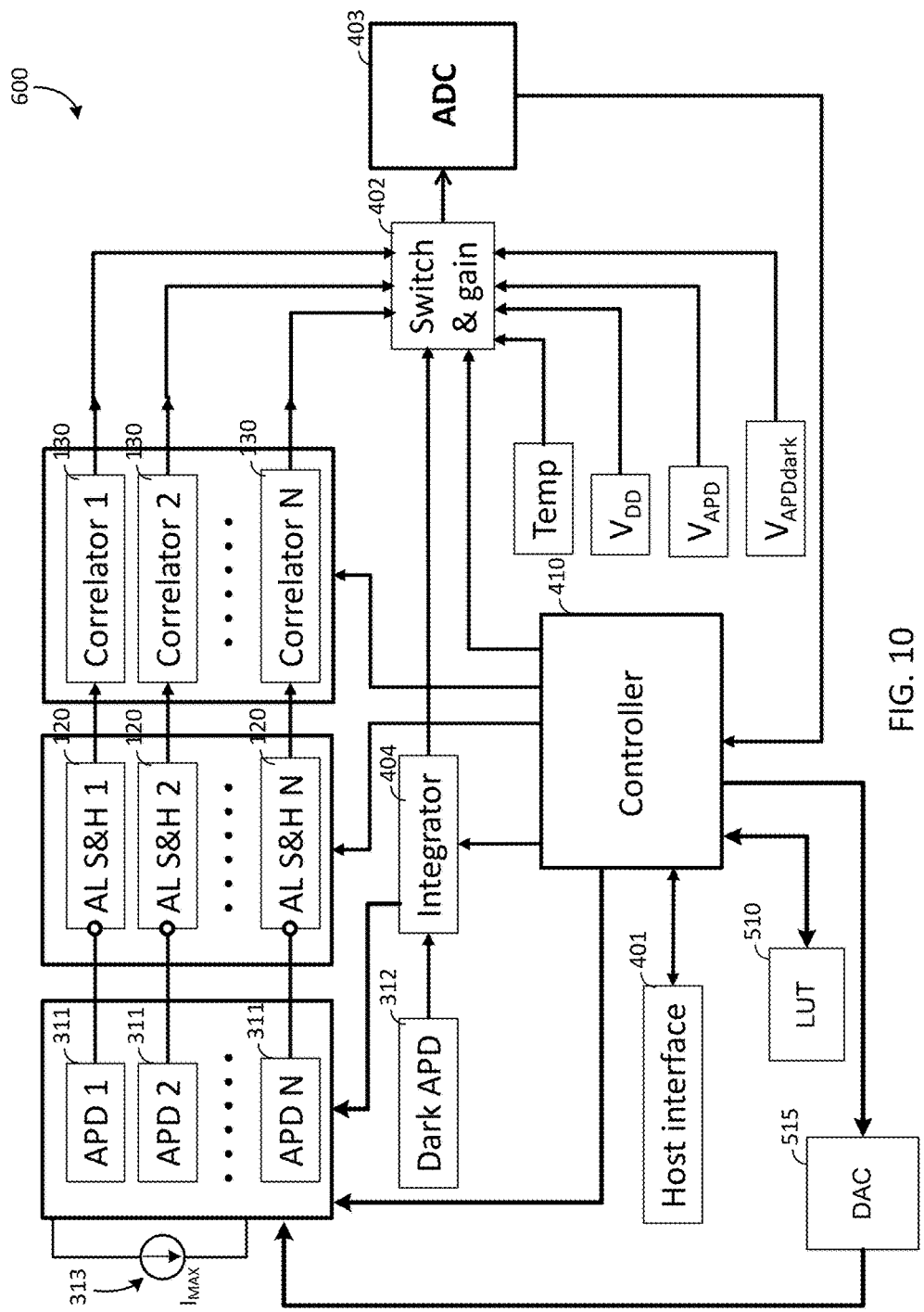
FIG. 10 shows an exemplary embodiment of an optical measurement system in accordance with the disclosure.

FIG. 10 illustrates a block diagram of the optical measurement system 600 in accordance with another illustrative embodiment. The optical measurement system 600 shown in FIG. 10 combines features of the optical measurement systems 400 and 500 shown in FIGS. 8 and 9, respectively. Like the optical measurement system 400 shown in FIG. 8, the optical measurement system 600 includes the current source 313 and the connection between the integrator 404 and the photodetector APDs 311. Like the optical measurement system 500 shown in FIG. 9, the optical measurement system 600 includes the connection between the integrator 404 and the switching and gain control circuitry 402. The optical measurement system 600 also includes the LUT 510, the temperature monitoring device 511, the supply voltage ($V_{DD}$) monitoring device 512, the photodetector APD monitoring device 513 and the dark APD monitoring device 514.

In accordance with this embodiment, the controller 410 uses the bias voltage values stored in the LUT 510 for coarse tuning of the bias voltages of the photodetector APDs 311. Therefore, the operations described above with reference to the optical measurement system 500 shown in FIG. 9 are performed to coarsely tune the bias voltages of the photodetector APDs 311. The operations described above with reference to the optical measurement system 400 shown in FIG. 8 are performed to finely tune the bias voltages of the photodetector APDs 311.

It should be noted that the invention has been described with reference to a few illustrative embodiments for the purpose of demonstrating principles and concepts of the invention. It will be understood by persons of skill in the art, in view of the description provided herein, that the invention is not limited to these illustrative embodiments. Persons of skill in the art will understand that many variations can be made to the illustrative embodiments without deviating from the scope of the invention.

What is claimed is:

1. An optical measurement system comprising:
   a first detector circuit comprising a combination of a photodetector and at least one gain element, the photodetector comprising an avalanche photodetector (APD) that converts optical signals incident thereon into electrical signals, the gain element amplifying the electrical signals to produce amplified electrical signals; and
   first correlator and ambient light suppression circuitry electrically coupled with the first detector circuit and configured to receive a first amplified electrical signal from the first detector circuit relating to an amount of ambient light that is incident on the photodetector and to receive a second amplified electrical signal from the first detector circuit relating to the amount of ambient light that is incident on the photodetector and an amount of desired light reflected from a target object that is incident on the photodetector, the first correlator and ambient light suppression circuitry processing the first and second amplified electrical signals to produce a compensated electrical signal from which an effect of ambient light has been removed, the first correlator and ambient light suppression circuitry correlating the compensated signal with a reference signal to determine a distance of the optical measurement system from the target object.

2. The optical measurement system of claim 1, wherein the first and second amplified electrical signals are first and second amplified current signals, respectively, and wherein the first correlator and ambient light suppression circuitry includes a first sample and hold circuit configured to be switched from a sampling mode of operations to a hold mode of operations, and vice versa, and wherein when the first sample and hold circuit is in the sampling mode, the first detector circuit outputs the first amplified current signal, and wherein when the first sample and hold circuit is in the hold mode, the first detector circuit outputs the second amplified current signal, and wherein a first correlator of the first correlator and ambient light suppression circuitry has a first input terminal that is electrically coupled to the first detector circuit and a second input terminal that receives a reference signal, wherein when the first sample and hold circuit is in the hold mode, the first correlator produces the compensated signal by using the first amplified current signal to suppress effects of ambient light on the second amplified current signal and correlates the compensated signal with the reference signal to determine a distance of the optical measurement system from the target object.

3. The optical measurement system of claim 1, wherein the first and second amplified electrical signals are first and second amplified current signals, respectively, and wherein the first correlator and ambient light suppression circuitry includes circuitry that converts the first and second amplified current signals into first and second voltage signals, respectively, subtracts the first voltage signal from the second voltage signal to produce the compensated signal and correlates the compensated signal with the reference signal to determine a distance of the optical measurement system from the target object.

4. The optical measurement system of claim 2, wherein the first sample and hold circuit comprises:
   a first transistor;
   a first switch arranged for selectively coupling a first terminal of the first transistor with a second terminal of the first transistor when the first sample and hold circuit is in the sampling mode and for decoupling the first terminal of the first transistor from the second terminal of the first transistor when the first sample and hold circuit is in the hold mode, the second terminal of the first transistor being electrically coupled with the detector circuit; and
   at least a first capacitor coupled to at least the first terminal of the first transistor.

5. The optical measurement system of claim 4, wherein the photodetector and the gain element are separate devices.

6. The optical measurement system of claim 4, wherein the gain element and the photodetector are integrated together in a single semiconductor device.

7. The optical measurement system of claim 6, wherein the detector circuit further comprises a second APD and wherein the second APD is shielded to prevent light from being incident on a photosensitive region of the second APD, and wherein the second APD is used to wherein the second APD is also used to automatically regulate a bias voltage of the photodetector APD to perform temperature and process compensation.

8. The optical measurement system of claim 7, wherein the first detector circuit further comprises:
   a current source electrically coupled to the photodetector APD and to the second APD, and wherein the current source regulates a total amount of electrical current flowing through the photodetector APD.

9. The optical measurement system of claim 8, further comprising:
   a second capacitor electrically coupled in parallel with the current source.

10. An optical measurement system comprising:
    N detector circuits, where N is a positive integer that is greater than or equal to 2, each detector circuit comprising a combination of a photodetector and at least one gain element, each respective photodetector converting optical signals incident thereon into electrical current signals, each respective gain element amplifying the respective current signals to produce respective amplified current signals;

N ambient light suppression circuits electrically coupled to the N detector circuits, respectively, each ambient light suppression circuit being configured to be switched from a sampling mode of operations to a hold mode of operations, and vice versa, and wherein when each ambient light suppression circuit is in the sampling mode, the respective detector circuit outputs a first amplified current signal relating to an amount of ambient light that is incident on the respective photodetector, and wherein when each ambient light suppression circuit is in the hold mode, the respective detector circuit outputs a second amplified current signal relating to the amount of ambient light that is incident on the respective photodetector and an amount of desired light reflected from a target object that is incident on the respective photodetector; and N correlator circuits, each correlator circuit having a first input terminal that is electrically coupled to a respective detector circuit and a second input terminal that receives a reference signal, wherein when each ambient light suppression circuit is in the hold mode, each correlator circuit produces a respective compensated signal by using the respective first amplified current signal to suppress effects of ambient light on the respective second amplified current signal and correlates the respective compensated signal with the reference signal to determine a distance of the optical measurement system from the target object.

11. The optical measurement system of claim 10, wherein each ambient light suppression circuit comprises a sample and hold circuit comprising:
a first transistor;
a first switch arranged for selectively coupling a first terminal of the first transistor with a second terminal of the first transistor when the ambient light suppression circuit is in the sampling mode and for decoupling the first terminal of the first transistor from the second terminal of the first transistor when the ambient light suppression circuit is in the hold mode, the second terminal of the first transistor being electrically coupled with the respective detector circuit; and
at least a first capacitor coupled to at least the first terminal of the first transistor.

12. The optical measurement system of claim 11, wherein each photodetector is an avalanche photodetector (APD) and wherein the gain element and the photodetector APD are integrated together in a single semiconductor device.

13. The optical measurement system of claim 12, further comprising:
a second APD that is shielded to prevent light from being incident on a photosensitive region of the second APD, and wherein the second APD is used to automatically regulate bias voltages of the photodetector APDs to perform temperature and process compensation.

14. The optical measurement system of claim 13, further comprising:
at least a first current source electrically coupled to the photodetector APDs and to the second APD, and wherein the first current source automatically regulates a total amount of electrical current flowing through the photodetector APDs.

15. The optical measurement system of claim 14, further comprising:
N capacitors electrically coupled in parallel with the current source.

16. The optical measurement system of claim 15, further comprising:

a switching circuit electrically coupled with the correlator circuits;
an analog-to-digital converter (ADC) in communication with the switching circuit; and
a controller in communication with the ambient light suppression circuits, with the correlator circuits, with the switching circuit and with the ADC.

17. The optical measurement system of claim 16, wherein the optical measurement system is monolithically integrated on the single semiconductor device.

18. The optical measurement system of claim 16, further comprising:
a temperature measurement device for measuring a temperature of at least the photodetector APDs, wherein the controller uses the measurement of temperature and the dark current produced by the second APD and operates in combination with the first current source to automatically regulate the bias voltages of the photodetector APDs and the electrical current flowing through the photodetector APDs and to perform temperature and process compensation.

19. The optical measurement system of claim 18, further comprising:
a lookup table, wherein the controller uses the temperature measurement and the dark current to lookup a bias voltage value from the lookup table and wherein the controller causes the bias voltages of the photodetector APDs to be adjusted based at least in part on the bias voltage value.

20. The optical measurement system of claim 19, wherein the controller uses the bias voltage value from the lookup table to perform coarse tuning of the bias voltages of the photodetector APDs and wherein the second APD and the first current source operate together to automatically regulate bias voltages of the photodetector APDs to perform fine tuning of the bias voltages of the photodetector APDs.

21. The optical measurement system of claim 18, further comprising:
a measurement device for measuring a supply voltage of the APDs;
a measurement device for measuring a bias voltage of the photodetector APDs; and
a measurement device for measuring a bias voltage of the second APD.

22. The optical measurement system of claim 15, further comprising:
a switching circuit electrically coupled with the correlator circuits;
an analog-to-digital converter (ADC) in communication with the switching circuit; and
a controller in communication with the ambient light suppression circuits, with the correlator circuits, with the switching circuit and with the ADC.

23. The optical measurement system of claim 22, further comprising:
a temperature measurement device for measuring a temperature of at least the photodetector APDs, wherein the controller uses the measurement of temperature and the dark current produced by the second APD to automatically regulate the bias voltages of the photodetector APDs and the electrical current flowing through the photodetector APDs and to perform temperature and process compensation.

24. The optical measurement system of claim 23, further comprising:
a lookup table, wherein the controller uses the temperature measurement and the dark current to lookup a bias voltage value from the lookup table and wherein the controller causes the bias voltages of the photodetector APDs to be adjusted based at least in part on the bias voltage value.

25. An optical measurement system comprising:
a first detector circuit comprising first and second photodetectors, the second photodetector being shielded to prevent light from being incident on a photosensitive region of the second photodetector, and wherein the second photodetector is used to automatically regulate a bias voltage of the first photodetector to perform temperature and process compensation, the first photodetector converting optical signals incident thereon into electrical signals; and
first correlator and ambient light suppression circuitry electrically coupled with the first detector circuit and configured to receive a first electrical signal from the first detector circuit relating to an amount of ambient light that is incident on the first photodetector and to receive a second electrical signal from the first detector circuit relating to the amount of ambient light and an amount of desired light reflected from a target object that is incident on the first photodetector, the first correlator and ambient light suppression circuitry processing the first and second electrical signals to produce a compensated electrical signal from which an effect of ambient light has been removed, the first correlator and ambient light suppression circuitry correlating the compensated signal with a reference signal to determine a distance of the optical measurement system from the target object.

26. The optical measurement system of claim 25, wherein the first detector circuit further comprises:
a current source electrically coupled to the first and second photodetectors, and wherein the current source regulates a total amount of electrical current flowing through the first photodetector.

27. The optical measurement system of claim 26, further comprising a capacitor electrically coupled in parallel with the current source.

* * * * *